(12) United States Patent
Spaulding et al.

(10) Patent No.: US 9,301,372 B2
(45) Date of Patent: Mar. 29, 2016

(54) LIGHT CONTROL METHOD AND LIGHTING DEVICE USING THE SAME

(75) Inventors: Jeremy Spaulding, Marblehead, MA (US); Jeffrey Holt, Exeter, NH (US); Karlin Jessen, Reading, MA (US)

(73) Assignee: OSRAM SYLVANIA INC., Wilmington, MA (US)

( * ) Notice: Subject to any disclaimer, the term of this patent is extended or adjusted under 35 U.S.C. 154(b) by 1063 days.

(21) Appl. No.: 13/294,614

(22) Filed: Nov. 11, 2011

(65) Prior Publication Data

US 2013/0120238 A1    May 16, 2013

(51) Int. Cl.
*G09G 5/00* (2006.01)
*H05B 37/02* (2006.01)

(52) U.S. Cl.
CPC .................. *H05B 37/0227* (2013.01)

(58) Field of Classification Search
USPC ............ 313/506; 315/360; 382/103; 345/1.1, 345/1.3, 156
See application file for complete search history.

(56) References Cited

U.S. PATENT DOCUMENTS

| | | | | |
|---|---|---|---|---|
| 6,570,555 B1 * | 5/2003 | Prevost et al. | ................ | 345/156 |
| 6,794,831 B2 * | 9/2004 | Leeb et al. | .................... | 315/307 |
| 6,950,534 B2 | 9/2005 | Cohen et al. | | |
| 7,453,217 B2 * | 11/2008 | Lys et al. | ...................... | 315/291 |
| 8,098,259 B2 * | 1/2012 | Kondo et al. | ................ | 345/594 |
| 2004/0193234 A1 * | 9/2004 | Butler | ............................ | 607/88 |
| 2004/0193413 A1 * | 9/2004 | Wilson et al. | ................ | 704/243 |
| 2008/0300055 A1 * | 12/2008 | Lutnick et al. | ................. | 463/39 |
| 2009/0191968 A1 * | 7/2009 | Johnson et al. | ................ | 463/37 |
| 2009/0195166 A1 | 8/2009 | Chen | | |
| 2009/0195191 A1 | 8/2009 | Chen | | |
| 2010/0014711 A1 | 1/2010 | Camhi | | |
| 2010/0199228 A1 | 8/2010 | Latta et al. | | |
| 2010/0244751 A1 | 9/2010 | Van Endert | | |
| 2010/0253241 A1 | 10/2010 | Van Endert | | |
| 2010/0264830 A1 | 10/2010 | Van Endert et al. | | |
| 2010/0277073 A1 | 11/2010 | Van Endert | | |
| 2011/0211110 A1 | 9/2011 | Doublet | | |

FOREIGN PATENT DOCUMENTS

WO    WO 03/027942 A1    4/2003

OTHER PUBLICATIONS

Search Report for International Application PCT/US2012/064301 Mailed Apr. 18, 2013.

* cited by examiner

*Primary Examiner* — Calvin C Ma
(74) *Attorney, Agent, or Firm* — Andrew Martin

(57) ABSTRACT

There is herein described a light output control method for a controlling a lighting device by a motion of an object near an environment, the lighting device comprising a video sensor and a light-emitting unit, the light output control method comprising steps of emitting an infrared light onto at least a part of the object and at least a part of the environment, collecting the infrared light reflected by at least the part of the object and at least the part the environment as a two-dimensional depth data sequence of the video sensor, computing the motion of the object by utilizing the two-dimensional depth data sequence, and controlling the light-emitting unit to change an attribute of the output light if the motion of the object complies with a predetermined condition.

20 Claims, 4 Drawing Sheets

LIGHT CONTROL METHOD AND LIGHTING DEVICE USING THE SAME

TECHNICAL FIELD

This invention relates to controlling lighting devices using gesture recognitions.

BACKGROUND

Remote controllers are important components of many electrical devices such as TVs, DVD players, air conditioners, home theater systems. Nowadays, remote controllers are also used to control the lighting of the house. The use of remote controllers facilitates the controlling process since the user can control the device remotely. However, a user still needs to find and pick up the remote controller before he or she can control the device. In addition, many different remote controls are already present in the room for multiple electronic devices. Further, the different buttons on a remote control can be confusing to the user. Finally, the costs of a remote control and the accompanying receiver can be relatively high.

It is desirable to reduce the dependence on remote controller while still providing simple and easy control devices. For example, lighting systems being controllable remotely without controllers have been demonstrated. For example, a lighting system may comprise an infrared transmitting and receiving unit. The distance between the user hand and receiving unit can be determined by the intensity of the infrared light reflected by the user hand and received by the receiving unit. The brightness or the color of the light output can be adjusted by changing the distance between the hand and the lighting device. In this manner the lamp can be dimmed by the hand position in front of the infrared beam. Such an arrangement is however relatively inaccurate, as the intensity of the reflected infrared signal heavily depends on the kind of object that is moved in the beam. Other disadvantages include that the hand position can only control one attribute of the light, i.e. the brightness, and that complicated gestures cannot be differentiated and recognized. Furthermore, the user needs to face toward the sensor in order to successfully control the device. In cases where in the light and the sensor are separated by a large distance or a wide angle, it is anti-intuitive to control a light by doing gesture in a direction not toward the light. Other disadvantages may include the inability to accurately select and control multiple light units.

SUMMARY OF THE INVENTION

It is an object of the invention to obviate the disadvantages of the prior art.

It is a further object of the invention to provide a gesture light control method and a lighting device using the method. The gestures are recognized in three-dimensional space and single user gesture can control multiple attributes of the output light. Complicated gestures may be differentiated and recognized to be assigned to control different attributes of the output light. The gestures can be recognized even when the user is not facing the sensor, regardless of the direction the user facing or stance direction of the user.

According to an embodiment, there is provided a light output control method for a controlling a lighting device by a motion of an object near an environment. The lighting device includes a video sensor and a light-emitting unit. The light output control method includes steps of emitting an infrared light onto at least a part of the object and at least a part of the environment, collecting the infrared light reflected by at least the part of the object and at least the part the environment as a two-dimensional depth data sequence of the video sensor, recognizing the motion of the object by utilizing the two-dimensional depth data, and controlling the light-emitting unit to change at least one attribute of the output light if the motion of the object complies with a predetermined condition.

According to another embodiment, there is provided a light output control method for a controlling a lighting device by a motion of an object near an environment. The lighting device includes a video sensor and a light-emitting unit. The light output control method includes steps of emitting an infrared light onto at least a part of the object and at least a part of the environment, collecting the infrared light reflected by at least the part of the object and at least the part the environment as a two-dimensional depth data sequence of the video sensor, outputting the two-dimensional depth data sequence via a wired or wireless outputting communication, obtaining the two-dimensional depth data sequence, recognizing the motion of the object by utilizing the two-dimensional depth data sequence, determining whether the motion of the object complies with a predetermined condition, issuing a control signal via a wired or wireless issuing communication if the motion does comply with the predetermined condition, receiving the control signal, and controlling the light-emitting unit to change at least one attribute of the output light.

According to yet another embodiment, there is provided a light output control method for a controlling a lighting device by a motion of a first object interacting with a second object near an environment. The lighting device includes a video sensor and a light-emitting unit. The light output control method includes steps of emitting an infrared light onto at least a part of the first and second objects and at least a part of the environment, collecting the infrared light reflected by at least the part of the first and second objects and at least the part the environment as a two-dimensional video data sequence of the video sensor, outputting the two-dimensional video data sequence via a first wired or wireless communication, obtaining the two-dimensional video data sequence, recognizing the motion of the first object by treating the two-dimensional video data sequence as a depth data sequence, determining whether the motion of the first object complies with a first predetermined condition, deciding whether the second object complies with a second predetermined condition, issuing a control signal via a second wired or wireless communication if the motion does comply with the first predetermined condition and the second object does comply with the second predetermined condition, receiving the control signal, and controlling the light-emitting unit to change at least one attribute of the output light.

According to still another embodiment, there is provided a lighting device controllable by a motion of an object near an environment. The lighting device includes at least a light-emitting unit, an infrared emitter, a video sensor, a processing unit, and a controlling unit. The infrared emitter emits an infrared light onto at least a part of the object and at least a part of the environment. The video sensor collects the infrared light reflected by at least the part of the object and at least the part the environment as a two-dimensional brightness data sequence of the video sensor and outputs the two-dimensional brightness data sequence. The processing unit obtains the two-dimensional brightness data sequence, recognizes the motion of the object by treating the two-dimensional brightness data sequence as a depth data sequence, determines whether the motion of the object complies with a predetermined condition, and issues a control signal if the motion does comply with the predetermined condition. The controlling unit receives the control signal and controls the light-emitting unit to change at least one attribute of the output light in response to the signal.

The user does not need to face toward the sensor in order to successfully control the device. For example, the gestures can be recognized even when the user is facing in a direction 90 degree from the direction of the sensor since the gestures are recognized in three-dimensional space. The invention allows the user to control a lighting device intuitively by doing gestures in a direction toward the light, even when the light and the sensor are separated by a large distance or a wide angle.

DETAILED DESCRIPTION

For a better understanding of the present invention, together with other and further objects, advantages and capabilities thereof, reference is made to the following disclosure and appended claims taken in conjunction with the above-described drawings.

Figure 1:
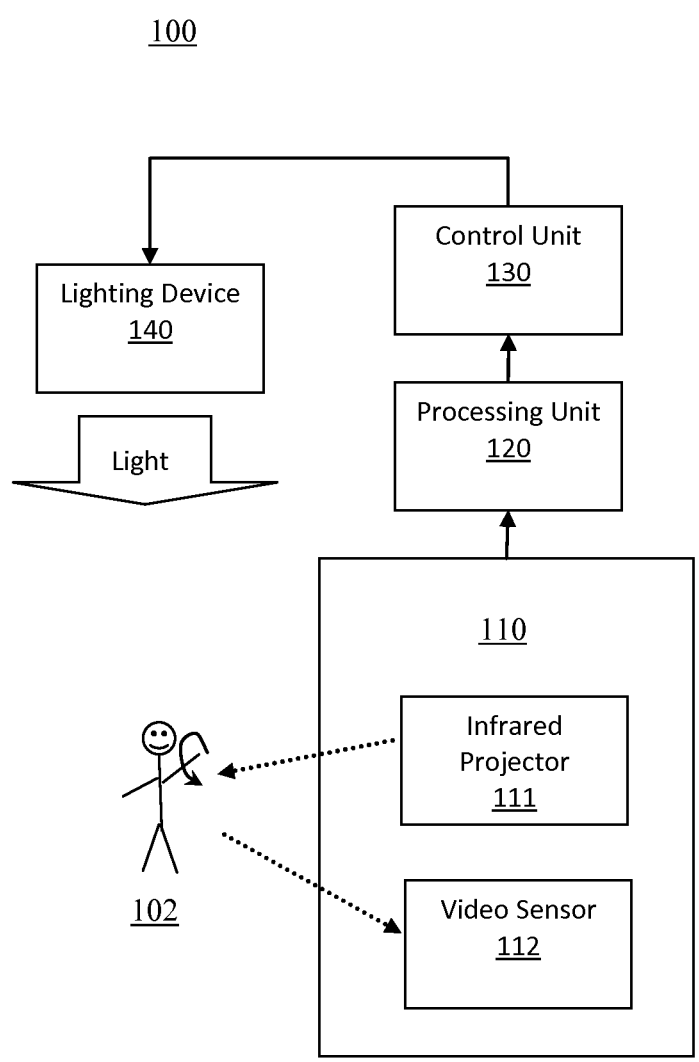
FIG. 1 is a schematic diagram illustrating a lighting device according to an embodiment of the invention.

With reference to FIG. 1, a lighting device 100, in accordance with an embodiment of the invention is shown. The lighting device 100 is controllable by a motion of a user 102 in lighting environment. For instance, the lighting device 100 may be controllable by a hand gesture from the user in a living room environment. The lighting device includes a gesture mapping sensor 110, a processing unit 120, a controlling unit 130, and at least one light-emitting unit 140. The light-emitting unit 140 emits an output light and may include, but is not limited to, a light emitting diode (LED) for emitting an output light.

The gesture mapping sensor 110 may include an infrared projector 111 and a video sensor 112. The infrared projector 111 provides a pattern over the scene. The video sensor 112 can be designed to be able to receive light in infrared range of the infrared projector 111. The video sensor 112 may be, but is not limited to, a CMOS or CCD sensor. The video sensor 112 captures a video data sequence of objects in the scene and the pattern provided by the infrared projector 111. Depth information is derived from correlating the motion of objects relative to the displayed pattern using a parallax effect. The video data sequence provides a two-dimensional depth data sequence that can be mapped to a color video image, which provides a form of computer stereo vision. Other methods can also be used to interpolate object motion and position as, for example, accomplished in Microsoft® Kinect's hardware and software. Thus, the video information captured by the video sensor 112 contains the depth information throughout the visible range of the video sensor 112 along the time.

In another embodiment, the gesture mapping sensor 110 may include an infrared projector 111 and a video sensor 112. The video sensor 112 can be designed to be able to receive light in infrared range. The video sensor 112 may be, but is not limited to, a CMOS or CCD sensor. The video sensor 112 captures a video data sequence. The video data sequence contains brightness information on every pixel of the two-dimensional video sensor 112. Thus, the video data sequence is a two-dimensional brightness data sequence. The infrared projector 111 emits infrared light in the observable range of the video sensor 112. The infrared projector 111 is designed so that the emitted infrared light is distributed substantially equally throughout the visible range of the video sensor 112. Preferably, the infrared projector 111 may be, but is not limited to, an infrared laser scanner. In some embodiments, the infrared laser scanner emits infrared light to the visible range of only one or several pixel of the video sensor 112 at one time. The infrared laser scanner continuously scans the entire visible range of the video sensor in a very short time-frame and repeats periodically. The emitted infrared light is reflected by any object or environment in front of the gesture mapping sensor 110, and is received by the video sensor 112. The distance between the video sensor 112 and the light reflecting object may be determined by the intensity of infrared light received by the video sensor 112. In case of the infrared projector 111 being an infrared laser scanner, the time stamp information can be used to determined which pixel region's depth information is being measured currently at even higher accuracy. The brightness of each pixel of the video sensor 112 indicates the depth information of the object within the visible range of that pixel. Thus, the video information captured by the video sensor 112 contains the depth information throughout the visible range of the video sensor 112 along the time. The two-dimensional brightness data sequence can be utilized as a depth data sequence.

The gesture mapping sensor 110 is not limited to an infrared projector 111 and a video sensor 112. The gesture mapping sensor 110 may also be multiple cameras imaging from different angles to provide stereo data that can be used to calculate three-dimensional data for captured two-dimensional images. Other source of three-dimensional data may include, for example, predetermined locations used to generate three-dimensional data. In this example, the presence of an individual at an entrance to a room or on a couch may provide relative positioning used to generate three-dimensional information from the captured images of the user performing the control gesture. In another example, electronic transmissions from a smartphone or key fob may also be used to provide relative position data that allow the gesture mapping sensor 110 to generate three-dimensional data. In some embodiments, the position data may be computed by, for example, the smartphone or personal data assistant and communicated to a gesture mapping sensor 110. In another embodiment, the gesture mapping sensor may detect reflected transmission of, for example, a key fob. Multiple sensors at separate positions may be used to determine the exact location of the key fob and thus user's gesture by correlating the received reflected transmission from multiple sensors at the different locations. In other embodiments GPS data and/or accelerometer data from the smartphone or other device can also be used to determine the position of the user and/or gesture of the user.

In one example, a combination of devices and methods may be used. A sensor in the room or specific to a lighting device may determine the presence and general position of the user. When the user produces a predetermined gesture with, for example, the smartphone; an accelerometer within the smartphone allows an application of the smartphone to determine that the predetermined gesture has been performed by the user. The smartphone may communicate with a control device for the lighting device or room by a wireless communication protocol, for example, Wi-Fi or other protocol. The smartphone communicates the gesture request to the control device. Only the control device of the lighting device that sensed the user proximity responds to the gesture request. In another example of a sensor for an entire room, a control device for a room determines which lighting device the user intends to control based on the general position sensed and reacts to the gesture request sensed by the smartphone to determine which lighting device in the room the user intends to control.

The depth data sequence throughout the captured images of the video sensor 112, along with a time stamp, can instantly be sent to the processing unit 120, via a wired or wireless communication. For example, the data sequence may be sent through a USB cable, or via a WI-FI network. The processing unit 120 compares the current depth information with the depth information having past time stamps. The processing unit 120 detects a motion of a user, i.e. a gesture, when the depth information changes significantly within a certain time period. Since the depth data sequence contains continuous depth information on a two-dimensional coordinate system, the processing unit 120 is able to interpret the gestures in three-dimensional space based on the continuous depth information. The processing unit 120 then determines the user input based on the gesture. If the gesture or motion complies with a predetermined condition, the processing unit 120 sends the control signal to the controlling unit 130, via a wired or wireless communication. For example, the control signal can be sent through a USB cable, or via WI-FI network. The controlling unit 130 receives the control signal and performs a light output control operation on the light-emitting unit 140, by changing one or more attributes of the output light. Therefore, the output light of the lighting device 100 is controllable in real time by a user's body gesture.

Figure 2:
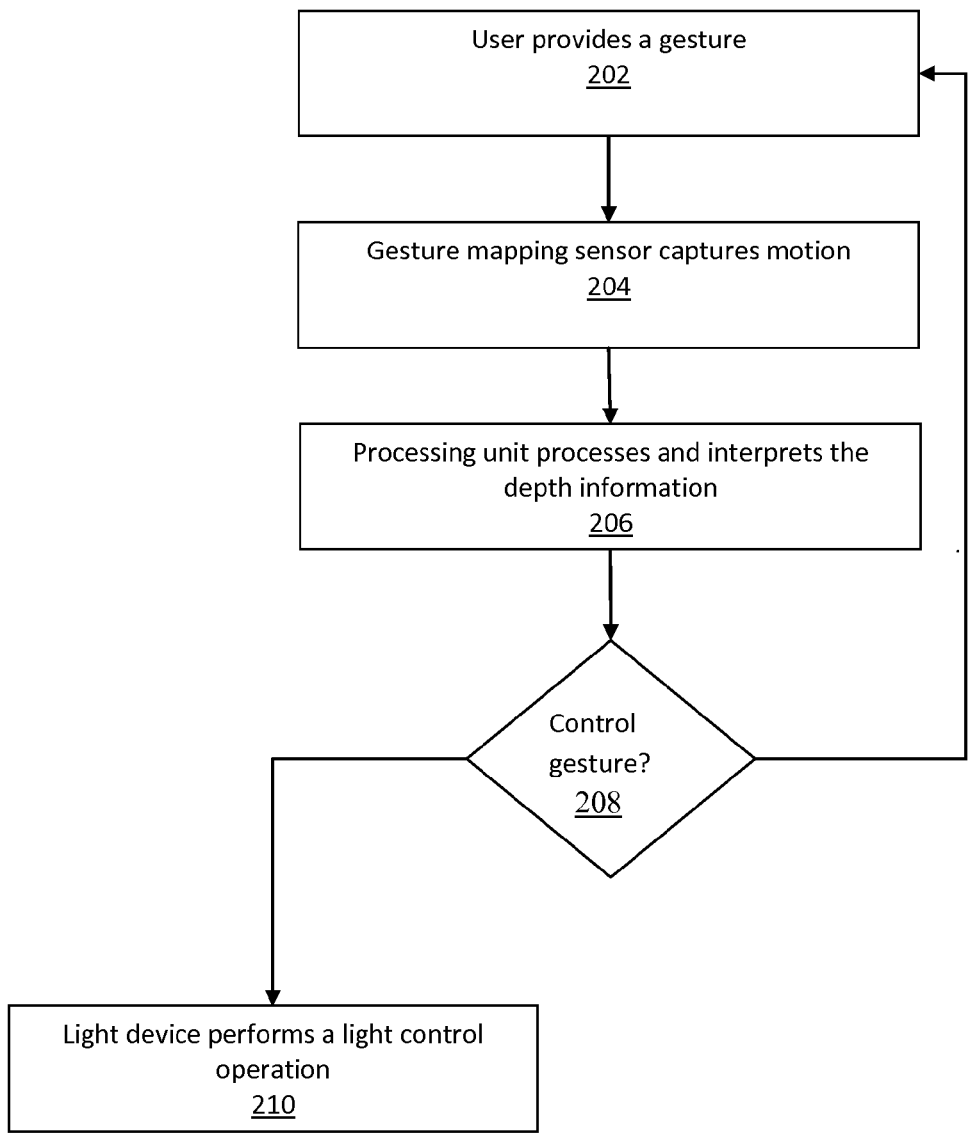
FIG. 2 is a flowchart illustrating a light output control method according to an embodiment of the invention.

Referring FIG. 2, embodiments of lighting control methods are illustrated in flowchart 200. Embodiments illustrate a user using a gesture to control the light. A user 102 stands in front of the video sensor 112 and performs a predetermined gesture (block 202). The real-time video sequence is capture by the video sensor 112 and sent to the processing unit 120 (block 204). The depth information is processed and interpreted into certain gesture in three-dimensional space by the gesture mapping sensor 110 or the processing unit 120 (block 206). If the interpreted gesture in three-dimensional corresponds with a certain predetermined gestures (block 208), the processing unit 120 sends a corresponding control signal to the controlling unit 130, and the light-emitting unit 130 performs a light output control operation under the direction of the controlling unit 130 (block 210). If the interpreted gesture does not correspond with any predetermined gesture, the processing unit 120 does not send any control signal and there is no light output control operation.

In other embodiments in accordance with the present invention, the lighting device detects the user's gesture in three-dimensional space in real time. According to the gesture of the user, the lighting device performs a corresponding light output control operation. One of the advantages of the present invention is that a single user gesture can control multiple attributes of the output light simultaneously, since the gesture is recognized in three-dimensional space. For example, the gesture motion along the depth (z-direction) may be interpreted to control the intensity of the output light. Of the same gesture, the motion along the plane in front of the user (x,y plane) may be interpreted to adjust the RGB color of the output light on a color wheel, in a circular motion.

In another embodiment in accordance with the present invention, an entry gesture may be predefined in the processing unit. For example, the entry gesture may be a gesture of "pointing toward the fixture." Once the entry gesture is captured and recognized by the processing unit, the lighting device is activated into a wake mode, which means the lighting device is ready to receive any further gesture to control the lighting operation. The entry gesture may be selected to be sample to understand by the user and easily recognized by the gesture mapping sensor 110. An example may include the user extend an elbow up and moving the forearm in the direction of the light the user desires to control. In another example, the user moves the arm in a board stroke upward, which gains to attention of the gesture mapping sensor 110 and then points in the direction of the light the user desires to control.

In cases where there are multiple lighting devices, by analyzing the direction of the pointing gesture, the processing unit can determine which light-emitting unit that the user wants to control and sending control signal for only the desired light-emitting unit. Before receiving the entry gesture, the lighting device can be in a sleep mode to avoid accidental controls, which means that unintended gestures are not resulting in controlling the light device in the sleep mode.

The controlled light output operation may also provide a visual feedback to the user as an indication of successful recognition of the user gesture. For example, the lighting device 140 may blink once to indicate to the user has performed a specific entry and selection gesture to select and control a specific lighting device. This may allow a user to differentiate which lighting device in a room has been selected by the user's gesture.

After the lighting device blinks and confirms the user's selection, the user can then perform more specific gestures to control attributes of the selected lighting device. The attributes include, for example, but are not limited to, color temperature, intensity, on/off ramp rates, timers, and scenes. The attributes may be cataloged in various pages, menus and submenus. The controlled light output operation may provide a visual feedback to the user as an indication of what attribute the user is currently selecting and/or controlling. For example, the lighting device 140 may cycle through a portion of the attribute to indicate to the user, which attribute in a menu or a submenu the user has selected. For example, the lighting device may ramp up and down by a small percentage from the current output to indicate the user has selected to control the intensity attribute of the lighting device. In another example, a slight shift away and back to the current color temperature may indicate the user has selected to control the color emitted by the light device. Various gestures as described herein may allow the user to efficiently navigate through the various pages, menus, submenus and select various attribute settings.

In one embodiment in accordance with the present invention, a page-forward gesture may be predefined in the processing unit. For example, the page-forward gesture may a gesture of "tossing a ball toward right." When the lighting device is in wake mode, the device is in one of the pages, in each page, the user is able to control one or more attributes of the output light. Once the page-forward gesture is captured and recognized by the processing unit, the processing unit switch the device to next page corresponding to certain attribute(s) of the output light.

In another embodiment in accordance with the present invention, a page-back gesture may be predefined in the processing unit. For example, the page-back gesture may be a gesture of "tossing a ball toward left." Once the page-back gesture is captured and recognized by the processing unit, the processing unit switches the device to the previous page corresponding to certain attribute(s) of the output light.

In another embodiment in accordance with the present invention, an increase gesture may be predefined in the processing unit. For example, the increase gesture may a gesture of "raising a hand." Once the increase gesture is captured and recognized by the processing unit, the processing unit sends a signal to the controlling unit to increase certain attributes of the output light, depending on the current page of the device.

In another embodiment in accordance with the present invention, a decrease gesture may be predefined in the processing unit. The decrease gesture may a gesture of "lowering a hand." Once the decrease gesture is captured and recognized by the processing unit, the processing unit sends a signal to the controlling unit to decrease certain attributes of the output light, depending on the current page of the device.

In another embodiment in accordance with the present invention, a circle gesture may be predefined in the processing unit. For example, the circle gesture may a gesture of "the hand moving along an imaginary circle." Once the circle gesture is captured and recognized by the processing unit, the processing unit interprets the hand position on the imaginary circle as indicating the targeting value for a certain attribute, and sends a signal to the controlling unit to adjust the attribute of the output light to the targeting value, depending on the current page of the device.

Another advantage of the present invention is that since multiple parts of the user's body movement are captured in three-dimensional space, complicated gestures can be differentiated and recognized. For example, the hand point and the elbow point both moving forward in a fast pace may be recognized as a punching gesture, while the hand point moving forward with the elbow point staying may be recognized as a throwing gesture. Therefore, many attributes of the output light may be controllable by different gestures without ambiguity.

In an embodiment in accordance with the present invention, an entry gesture may involve boarder strokes gestures that are easier for the gesture mapping sensor 110 to recognize and/or less likely to be confused with gestures that are not intend by the user to be recognized by the lighting device. Once the entry gesture is captured and recognized by the processing unit, the lighting device is activated into a wake mode. More complicated or intricate gestures may then be provided by the user to select specific attributes of control. By using an entry gesture with less intricate features several advantages can be provided, for example, reduced chance of unintended activation and/or faster recognition of a entry command.

In addition, a global coordinate system can be used by the gesture mapping sensor for the entry gesture. Once the entry gesture is recognized the gesture mapping sensor can use a local coordinate system based on the determined location of the user. This can provide benefits when controlling multiple lighting devices and/or when the user may be in various locations in the room or facing various directions. In one embodiment the gesture mapping sensor may use specific information of the entry gesture to determine the location and the direction the user is facing along with the which lighting device the user intends to control. The gesture-mapping sensor may use directional information of the user to supply a local coordinate system and better determine subsequent specific control gestures.

In another embodiment in accordance with the present invention, an exit gesture may be predefined in the processing unit. For example, the exit gesture may be a gesture of "tossing a ball toward the fixture" or a board sweeping of the arm in the horizontal direction. Once the exit gesture is captured and recognized by the processing unit, the lighting device switches to sleep mode, which means no further gesture will result in controlling the lighting operation (with the except of future entry gestures). The lighting device may also be configured to have timeout function, which means if there is not a gesture recognized within a certain time period, the lighting device automatically switches to sleep mode.

In another embodiment in accordance with the present invention, a light-on gesture may be predefined in the processing unit. The light-on gesture may be the same or similar to the entry gesture. The light-on gesture may also be a board or sweeping gesture to provide similar advantages as described with regard to the entry gesture. For example, the light-on gesture may a gesture of "fast moving the hand upward." Once the light-on gesture is captured and recognized by the processing unit, the processing unit sends a signal to the controlling unit to turn on the light-emitting unit. The light-on gesture may be configured as overriding the wake and sleep modes, which means the light-on gesture can be recognized and be controlling any time when the lighting device is running, regardless of being in wake or sleep mode.

In another embodiment in accordance with the present invention, a light-off gesture may be predefined in the processing unit. For example, the light-off gesture may be a gesture of "moving the hand in a fast downward motion." Once the light-off gesture is captured and recognized by the processing unit, the processing unit sends a signal to the controlling unit to turn off the light-emitting unit. The light-off gesture may be configured as overriding the wake and sleep modes, which means the light-off gesture can be recognized and be controlling any time when the lighting device is running, regardless of being in wake or sleep mode.

Figure 3:
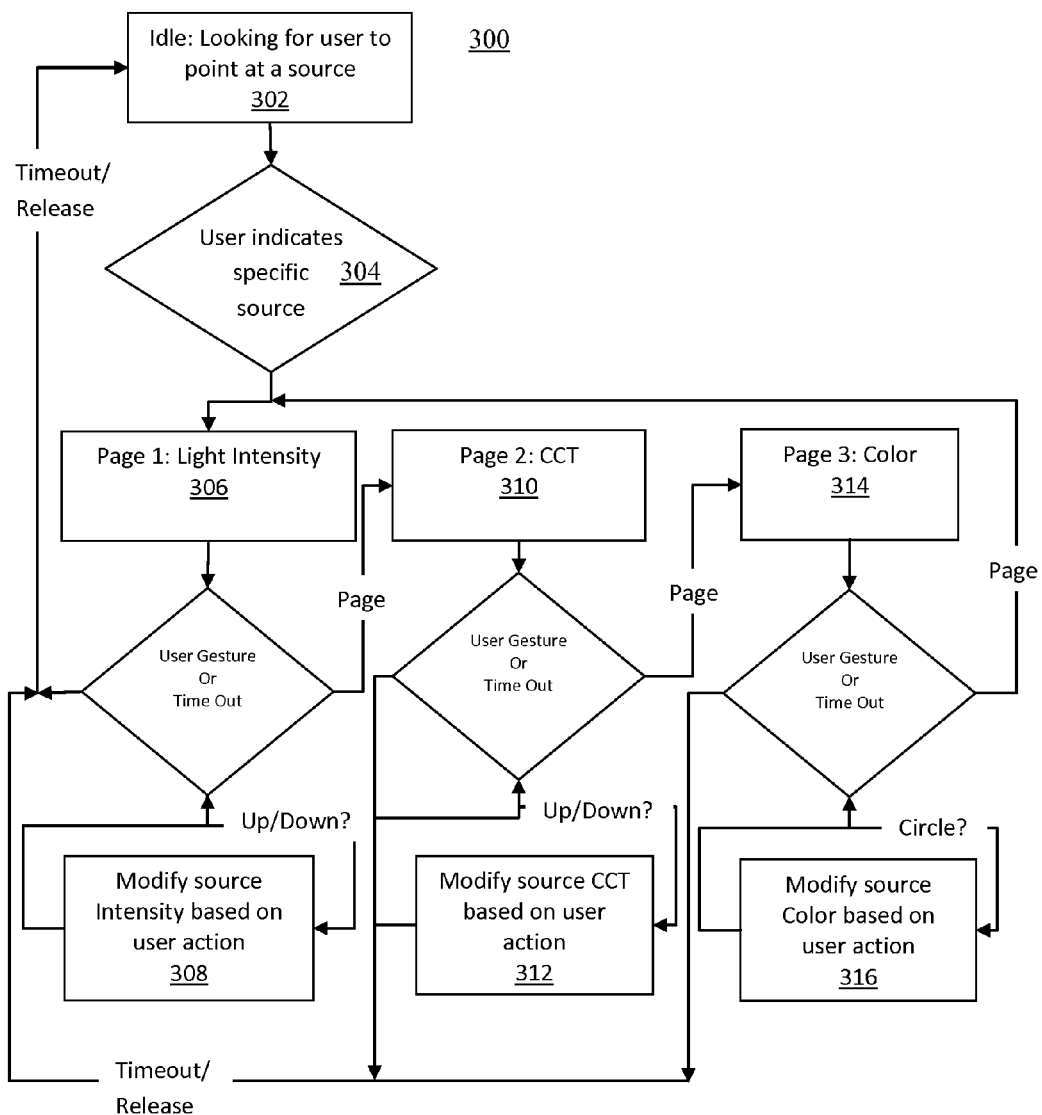
FIG. 3 is a flowchart illustrating a light output control method according to a page menu embodiment of the invention.

With reference to FIG. 3, a gesture light control method 300, in accordance with an embodiment of the present invention is shown. Initially the light device may be in sleep mode status, most gestures may be ignored and not result in controlling the output light in the sleep mode to avoid accidental controls. Once the processing unit recognizes an entry gesture (302), the lighting device switches to wake mode. In embodiments with multiple light sources, the user may indicate which specific light source the user intends to control (304). Immediately after switching to wake mode, the lighting device can switch into the default page 1 (306). The page 1 is the light intensity page. If the processing unit recognizes an increase or decrease gesture, the processing unit sends corresponding signal to the controlling unit. The controlling unit increases or decreases the intensity of the output light correspondingly (308). If the processing unit recognizes page-forward gesture, the processing unit switches the lighting device into page 2 (310). The page 2 of the lighting device menu can be, for example, the correlated color temperature (CCT) page. If the processing unit recognizes an increase or decrease gesture, the processing unit sends corresponding signal to the controlling unit. The controlling unit increases or decreases the correlated color temperature of the output light correspondingly (312). If the processing unit recognizes page-back gesture, the processing unit switches back the lighting device to page 1 (306). If the processing unit recognizes page-forward gesture, the processing unit switches the lighting device into page 3 (314). The page 3 of the lighting device menu may be, for example, the color wheel page. Once the circle gesture is captured and recognized by the processing unit, the processing unit interprets the hand position on the imaginary circle as indicating the targeting color on a color wheel, and sends a signal to the controlling unit to adjust the color of the output light to the targeting color (316). The page-back and page-forward gestures are recognized to move the lighting device back and forward between page 1, 2 and 3. The lighting device may be configured to have timeout function, which means during the wake mode if there is not gesture recognized within a certain time period, the lighting device automatically switches to sleep mode. The light-on and light-off gestures may be recognized anytime regardless of the device being in wake or sleep mode. Once the light-on or light-off gesture is captured and recognized by the processing unit, the processing unit sends a signal to the controlling unit to turn on or off the light-emitting device.

Figure 4:
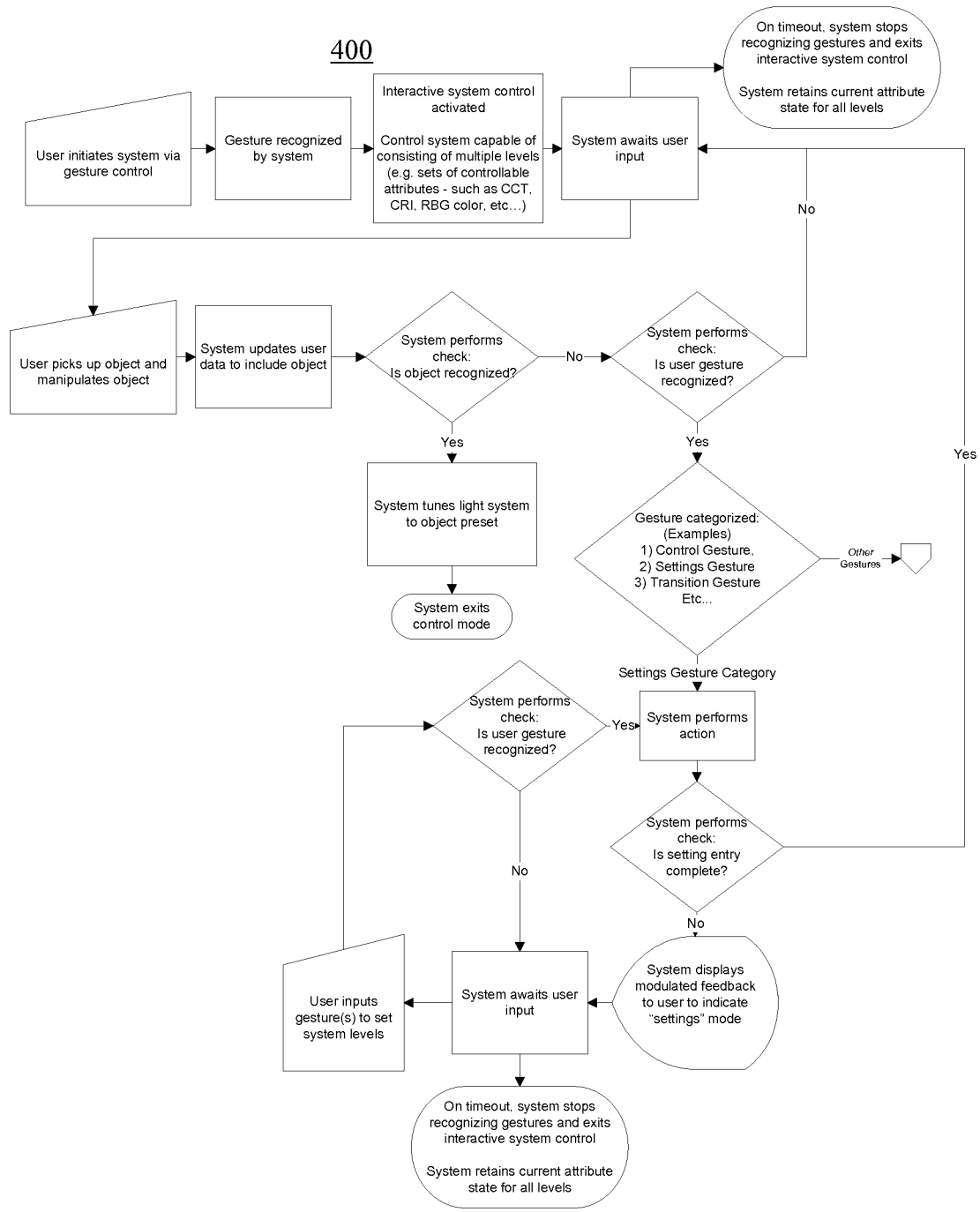
FIG. 4 is a flowchart illustrating a light output control method according to a first object interacting with a second object embodiment of the invention.

In another embodiment in accordance with the present invention, an environmental gesture may be predefined in the processing unit. The environmental gesture may be a motion of a first object interacting with a second object as illustrated in the method 400 in FIG. 4. For example, the environmental gesture may a gesture of "the user picking up and raising a wine glass." The wine glass may be predefined in the processing unit or defined previously by the user. Once the environmental gesture is captured and recognized by the processing unit and the wine glass is recognized as the proper environmental object, the processing unit finds the corresponding targeting values for a group of attributes, and sends a signal to the controlling unit to adjust the attributes of the output light to the targeting values. The environmental gesture may be configured as overriding the pages, which means the environmental gesture can be recognized and be controlling any time when the lighting device is in wake mode, regardless of which page the lighting device is currently in.

The environment gesture is not limited to a physical object. The environment gesture, for example, may be emitting and/or directing a beam or source of electromagnetic information. For example, the combination of an entry gesture and the emission by infrared remote may be used to signal the user desires to select a specific scene. In this example, the user may use the remote control for a TV and press any button causing an infrared emission while performing an entry gesture with the hand holding the remote. The lighting device may recognize the environmental gesture (the combination of entry gesture and infrared emission) and reduce the intensity of light for specific lighting devices to create a movie scene. In this example, the exact infrared pattern or communication code of the infrared signal may be irrelevant to the environment gesture. The gesture mapping sensor 110 may only be concerned with the emission of an infrared spectrum combine with an entry gesture.

In another embodiment in accordance with the present invention, the gesture mapping sensor may be positioned to provide efficient recognition of the gesture by the user. The gestures can be recognized regardless the direction of sensor. The user does not need to face toward the sensor in order to successfully control the device. For example, the sensor may be mounted on the south wall of the room, and one of the lights may be mounted on the northeast corner of the room. The user can intuitively control the light by doing gesture facing the light, instead of facing the sensor. Moreover, when there are multiple lights, the gesture recognized in three-dimensional space enables the device to recognize which light the user want to control.

While the principles of the invention have been described herein, it is to be understood by those skilled in the art that this description is made only by way of example and not as a limitation as to the scope of the invention. Reference numerals corresponding to the embodiments described herein may be provided in the following claims as a means of convenient reference to the examples of the claimed subject matter shown in the drawings. It is to be understood however, that the reference numerals are not intended to limit the scope of the claims. Other embodiments are contemplated within the scope of the present invention in addition to the exemplary embodiments shown and described herein. Modifications and substitutions by one of ordinary skill in the art are considered to be within the scope of the present invention, which is not to be limited except by the recitations of the following claims.

What is claimed is:

1. A light output control method for a controlling a general illumination lighting device by a motion of an object near an environment, the general illumination lighting device comprising a video sensor and a light-emitting unit, the light output control method comprising steps of:
    emitting an infrared light onto at least a part of the object and at least a part of the environment;
    collecting the infrared light reflected by at least the part of the object and at least the part the environment as a two-dimensional depth data sequence of the video sensor;
    recognizing the motion of the object by utilizing the two-dimensional depth data sequence; and
    controlling the general illumination lighting device to change at least one attribute of the output light if the motion of the object complies with a predetermined condition wherein the general illumination device is a plurality of independently controlled lighting fixtures.

2. The light output control method of claim 1, the light output control method further comprising steps of:
    outputting the brightness data sequence;
    obtaining the brightness data sequence;
    determining whether the motion of the object complies with a predetermined condition;
    issuing a control signal if the motion does comply with the predetermined condition; and
    receiving the control signal.

3. The light output control method of claim 1, wherein the object is a human and the motion of the object is a gesture of the human using one or two arms of the human.

4. The light output control method of claim 1, wherein the controlling step further comprises:
    controlling the light-emitting unit to turn off the output light if the motion of the object complies with a predetermined light-off condition.

5. The light output control method of claim 1, wherein the controlling step further comprises:
    controlling the light-emitting unit to turn on the output light if the motion of the object complies with a predetermined light-on condition.

6. The light output control method of claim 1, wherein the controlling step further comprises:
    controlling the light-emitting unit to adjusting an intensity of the output light if the motion of the object complies with a predetermined intensity increase or intensity decrease condition.

7. The light output control method of claim 1, wherein the controlling step further comprises:
    controlling the light-emitting unit to adjusting a correlated color temperature of the output light if the motion of the object complies with a predetermined increase CCT or decrease CCT condition.

8. The light output control method of claim 1, wherein the controlling step further comprises:
    controlling the light-emitting unit to adjusting a color of the output light if the motion of the object complies with a predetermined color wheel condition.

9. The light output control method of claim 1, wherein the outputting step further comprises:

outputting the two-dimensional brightness data sequence via a wired or wireless communication.

10. The light output control method of claim 1, wherein the issuing step further comprises:
   issuing a control signal via a wired or wireless communication if the motion does comply with the predetermined condition.

11. A light output control method for a controlling a lighting device by a motion of a first object interacting with a second object near an environment, the lighting device comprising a video sensor and a lamp, the light output control method comprising steps of:
   emitting an infrared light onto at least a part of the first and second objects and at least a part of the environment wherein the first object is a human;
   collecting the infrared light reflected by at least the part of the first and second objects and at least the part the environment as a two-dimensional video data sequence of the video sensor;
   outputting the two-dimensional video data sequence via a first wired or wireless communication;
   obtaining the two-dimensional video data sequence;
   recognizing the motion of the first object by treating the two-dimensional video data sequence as a depth data sequence;
   determining whether the motion of the first object complies with a first predetermined condition;
   deciding whether the second object complies with a second predetermined condition;
   issuing a control signal via a second wired or wireless communication if the motion does comply with the first predetermined condition and the second object does comply with the second predetermined condition;
   receiving the control signal; and
   controlling the lamp to change at least one attribute of the output light of the lamp.

12. The light output control method of claim 11, wherein the first object is a human and the motion of the first object is a gesture of the human while holding the second object.

13. A lighting device controllable by a motion of an object near an environment, the lighting device comprising:
   at least two light-emitting units wherein each light-emitting unit are separate general illumination lighting fixtures;
   an infrared emitter emitting an infrared light onto at least a part of the object and at least a part of the environment;
   a video sensor collecting the infrared light reflected by at least the part of the object and at least the part the environment as a global two-dimensional depth data sequence of the video sensor relative to a global coordinate system wherein the global coordinate system is specific to two more light-emitting units and outputting the global two-dimensional depth data sequence;
   a processing unit obtaining the global two-dimensional depth data sequence and determining whether the motion of the object complies with a global predetermined condition and issuing a global control signal if the motion does comply with the global predetermined condition;
   the video sensor collecting the infrared light reflected by at least the part of the object and at least the part the environment as a local two-dimensional depth data sequence of the video sensor relative to a local coordinate system wherein the local coordinate system is specific to one of the light-emitting units and outputting the local two-dimensional depth data sequence, and issuing a local control signal if the motion does comply with a local predetermined condition; and
   a controlling unit receiving the local and global control signals and controlling one of the at least two light-emitting unit to change at least one attribute of the output light in response to the local and global control signals.

14. The lighting device of claim 13, wherein the global predetermined condition is a gesture selecting one of the at least two light-emitting units.

15. The lighting device of claim 13, wherein the local predetermined condition is a gesture selecting an attribute of one of the at least two light-emitting units.

16. The lighting device of claim 15, wherein the attribute of the output light is an intensity of the output light.

17. The lighting device of claim 15, wherein the attribute of the output light is a correlated color temperature of the output light.

18. The lighting device of claim 15, wherein the attribute of the output light is a color of the output light.

19. The lighting device of claim 15, wherein the attribute of the output light is an on/off status of the output light.

20. The lighting device of claim 15, wherein the light-emitting unit comprises a light emitting diode.

* * * * *